Oct. 18, 1938.  J. ZVANUT  2,133,337
CLOTHESLINE REEL
Filed June 12, 1937
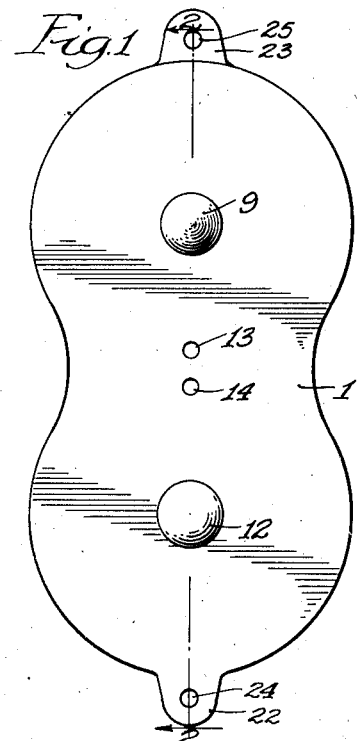
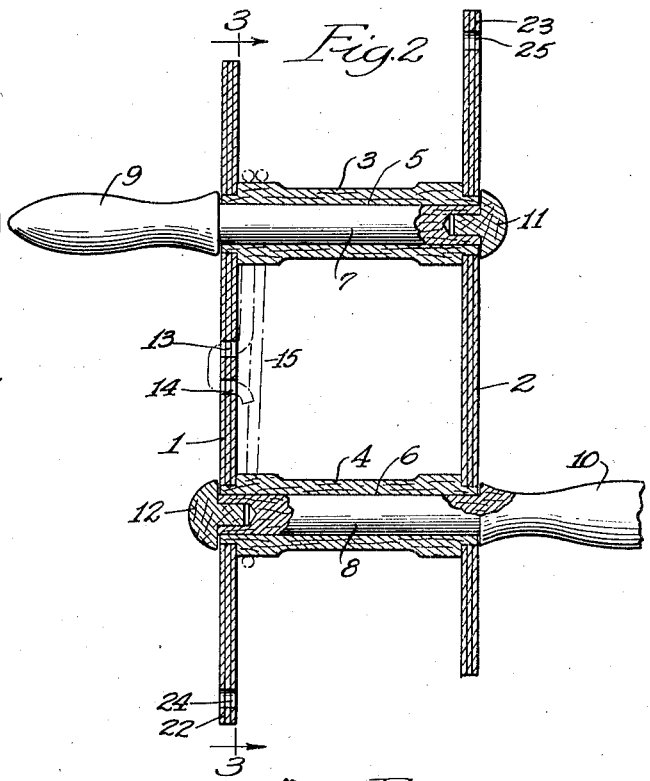
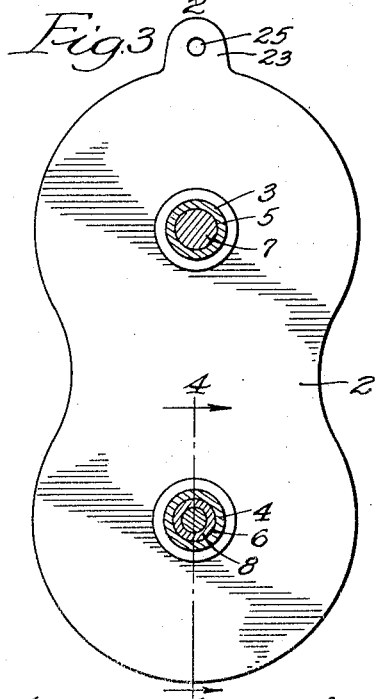
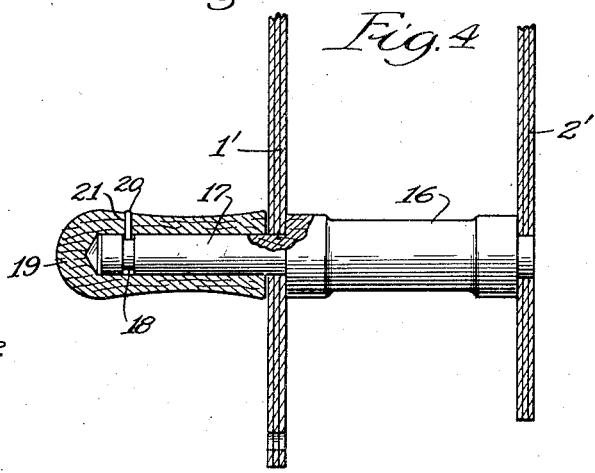
Inventor:
Joseph Zvanut,
By his Attorneys.

Patented Oct. 18, 1938

2,133,337

UNITED STATES PATENT OFFICE 2,133,337

CLOTHESLINE REEL

Joseph Zvanut, Aurora, Ill.

Application June 12, 1937, Serial No. 147,802

2 Claims. (Cl. 242—96)

This invention relates to clothesline reels; and the main objects of this invention are to provide a simplified and better reel of this kind; to provide a light reel body having a pair of rotatable handles for its manipulation; to provide a reel having a shielding body with relatively wide and long side frame members adapted to protect the clothesline wound therebetween from foreign contact, as when the reel is laid on the ground; to provide a reel having fixed winding-bars in spaced relation between the side shields in or on which bars or parts thereof the operating handles may be journaled; and to provide a durable reel of this type which will be simple in construction and inexpensive to manufacture.

This invention is illustrated by the accompanying drawing in which:

Fig. 1 is a side view of my improved device, as viewed from the left of Fig. 2.

Fig. 2 is a cross-sectional view taken on the line 2—2 of Fig. 1.

Fig. 3 is a cross-sectional view taken on the line 3—3 of Fig. 2.

Fig. 4, as compared with the lower part of Fig. 2, shows a cross-sectional view of a modified form of my device taken as on the line 4—4 of Fig. 3.

Referring more in detail to the drawing, my improved clothesline reel comprises a pair of like side frame or shield members 1 and 2 made light and strong of plywood and spaced apart by means of hollow bars or hubs 3 and 4, fixed to said side frames by insertion of their ends in the apertures provided in the side frames.

These like bars 3 and 4 are provided with cylindrical apertures 5 and 6 for reception of the spindles 7 and 8 of handles 9 and 10.

The journal spindles 7 and 8 are provided with headed plug means 11 and 12 for securing the handles in position.

One of the shield members 1 has special holes 13 and 14 to receive one end of a clothesline 15 for the purpose of anchoring it to the reel.

In the modified construction shown in Fig. 4, the bar 16 is fixed to the side frame shields 1' and 2' and is provided with a projecting journal shank 17, the distal end of which has a peripheral groove 18. A hollow handle 19 fits rotatably on said shank 17 and is secured against endwise escape by a key 20 set in the key hole 21 and engaging said groove 18.

In operation, one end of the clothesline is secured to the side frame member 1 and the handles 9 and 10 are clasped one in each hand. The device is then rotated by appropriate movement of the hands and the line is wound up and supported on the bars 3 and 4, where it is protected by the shield plates 1 and 2.

It is apparent that the side frame members 1 and 2 being relatively wide and long, as shown in Figs. 1 and 3 the line wound on the reel will be protected from soiling even when the reel is laid on the ground, and further that as the handles are rotatable the device is always readily operable.

For convenience in hanging up or storing away the reel, ears 22 and 23 with holes 24 and 25 are provided on the shield members 1 and 2 respectively.

It is to be understood that some of the details set forth may be altered or omitted without departing from the spirit of the invention as defined by the appended claims.

I claim:

1. A clothesline reel comprising a pair of side frame members, a pair of hollow bars fixed to and between said frame members in spaced relation to separate said members, a pair of hand spindles having long cylindrical pivot shanks adapted for insertion one in each of said bars, the ends of each of said shanks opposite the handle portion having an aperture, headed plug means adapted to be inserted in said shank apertures for securing said spindles rotatably in said bars, the handles on said spindles being disposed to project from opposite sides of said reel respectively, and means for securing one end of a clothesline to one of said frame members for winding on said reel.

2. A clothesline reel comprising a pair of side frame members, a pair of spacer bars fixed to and between said frame members in spaced relation to separate said members and each provided with a cylindrical shank arranged to project through and extend beyond a respective one of each of said members, a groove on each of said shanks located adjacent its outer end, a hollow handle on each of said shanks having an aperture disposed to register with the groove in the respective shank and means in each of said apertures extending into the respective shank groove to rotatably retain said handles on said shanks.

JOSEPH ZVANUT.